Oct. 10, 1950  R. G. CLARK  2,524,959
TRACK FOR PORTABLE CHICKEN COOPS
Filed Nov. 5, 1948
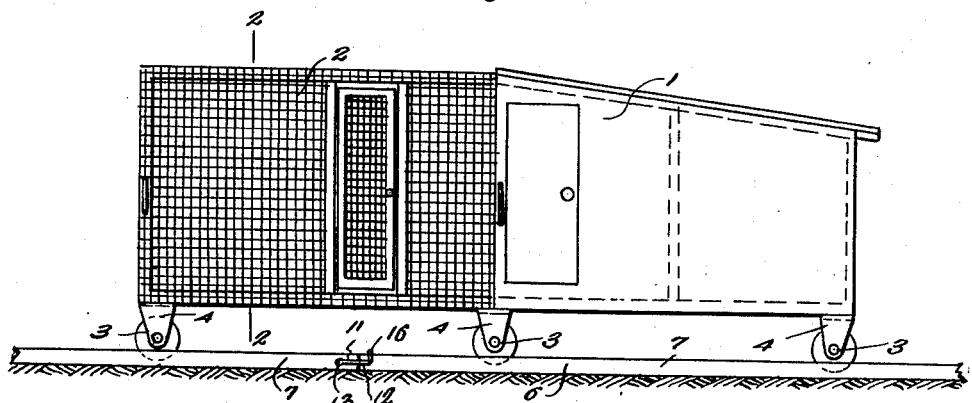
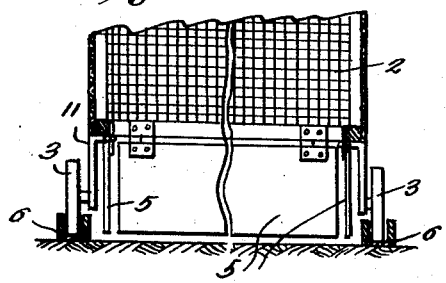
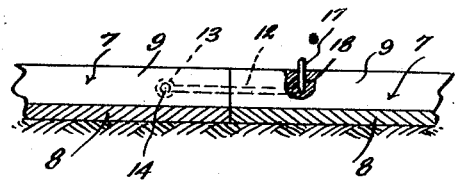
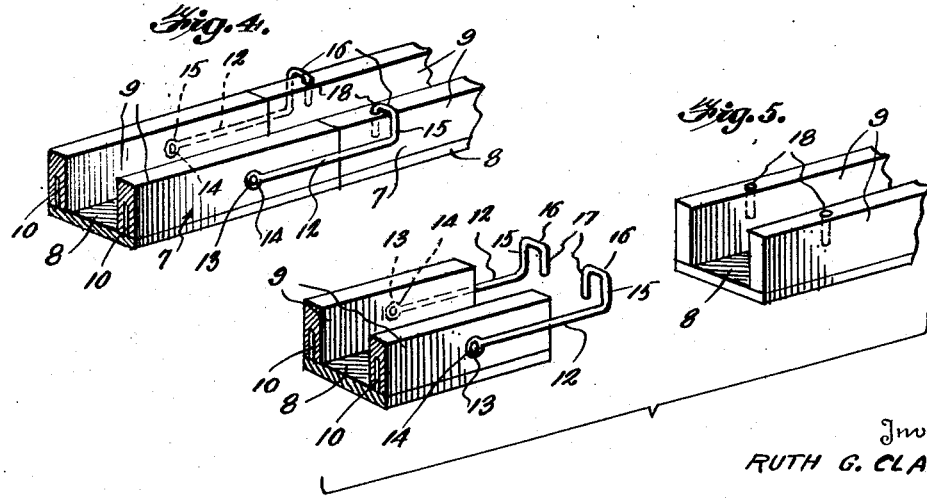
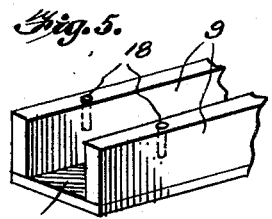
Inventor
RUTH G. CLARK Patented Oct. 10, 1950

2,524,959

UNITED STATES PATENT OFFICE 2,524,959

TRACK FOR PORTABLE CHICKEN COOPS

Ruth G. Clark, Oakland, Calif.

Substituted for application Serial No. 318,144, February 9, 1940. This application November 5, 1948, Serial No. 58,455

1 Claim. (Cl. 238—166)

This invention relates to a track for a portable chicken coop and the present invention constitutes a substitute for my prior application Ser. No. 318,144, filed Feb. 9, 1940.

One object of the invention is to provide a track which is particularly adapted for use in connection with a portable chicken coop, the track being formed of sections adapted to be disposed in alignment with each other so that the coop may be rolled along the tracks from one location to another in a chick yard and then serve as a foundation upon which the coop may rest.

Another object of the invention is to provide a track formed of sections which may be easily detached and shifted ahead of the coop so that the coop may be moved an indefinite distance upon tracks which are comparatively short.

Another object of the invention is to provide tracks wherein the rails or track sections are formed with upstanding flanges or walls along their sides so that as the coop is moved along the tracks, its wheels will be prevented from moving off the tracks.

Another object of the invention is to provide improved fasteners for detachably but securely holding rails or track sections in alignment with each other and securely prevent them from accidentally moving transversely out of alignment.

Another object of the invention is to so form the fasteners that while they may be easily swung into or out of operative position they will not be liable to be accidentaly moved to inoperative position.

In the accompanying drawings:

Fig. 1 is a side view showing a portable chicken coop resting on tracks of the improved construction.

Fig. 2 is a view on the line 2—2 of Fig. 1.

Fig. 3 is a fragmentary sectional view taken longitudinally through a track of the improved construction.

Fig. 4 is a perspective view of connected end portions of the track sections or rails.

Fig. 5 is a perspective view showing end portions of track sections released and separated from each other.

The improved tracks are used in connection with a portable chicken coop, such as shown in Fig. 1, and indicated in general by the numeral 1. This coop has a runway or yard 2 extending from its front end and the coop and yard are provided with castors consisting of wheels 3 carried by brackets 4, the wheels being of such size that the coop may be easily pushed along the tracks from one location to another in a chicken yard. Since the wheels 3 support the coop and its yard in an elevated position, there have been provided boards 5 along sides and ends of the coop and yard for closing space between the tracks and the coop and its yard, to prevent chickens from escaping and also prevent dogs, cats, rats, or other animals from entering and disturbing or killing the chickens.

The tracks 6 upon which the coop and its yard are supported, extend longitudinally of the coop at opposite sides thereof and rest upon the ground with the wheels 3 resting upon the tracks. The tracks are formed of companion rails 7 disposed in end to end relation to each other and, while in the present illustration, each track has been shown formed of two rails of somewhat greater length than the coop and its yard, it will be understood that any number desired may be provided. These rails or track sections are formed of wood and each consists of a bottom strip 8 along side edge portions of which are upstanding strips 9 secured by nails 10 and constituting side walls for the rail and serving to prevent the wheels 3 from moving off the rails as the coop is rolled along the tracks. During such movement of the coop along the tracks, the rails are lifted from the ground as the coop moves forwardly off them, and carried forwardly to a position in front of the coop where they are placed on the ground and aligned with rails upon which the wheels are resting, and the coop again pushed forwardly. This progressive shifting of the rails is continued until the coop has reached a desired location, and the tracks will then serve as foundations for the coop. The rails must be kept in alignment with each other and in order to do so each rail has one end provided with hooks 11. These hooks are formed of thick wire or light rod metal and each has a straight shank 12 formed at its rear end with an eye 13 to receive a screw or other suitable fastener 14 by means of which the hook is pivoted to the rail. The hooks are located at opposite sides of the rail, where they are pivotally mounted against outer side faces of the side walls 9 and of such length that they will project from the adjacent end of the rail and overlap the adjacent end portion of a companion rail, as shown in Fig. 4. Free end portions of the wire strands from which the hooks are formed are bent upwardly, as shown at 15, and then inwardly, as shown at 16, with terminals of the strands bent downwardly to form fingers or pins 17. When the hooks are in the operative position shown in Figs. 3 and 4 of the drawings, the portions 16 thereof rest upon upper edge faces of the rail and the pins 17 engage in sockets 18 formed by drilling holes in the side walls 9 adjacent to the opposite end of the rail from that to which the hooks are connected. Since the bills or hooked portions of the side walls and the shanks extend along the outer side faces of these walls, the rails will be held against transverse movement and, since the fingers 17 engage in the sockets 18, the connected rails will be prevented from shifting longitudinally away from each other. By swinging one hook to inoperative position and leaving the other in operative position, the finger 17 thereof may serve as a pivot and allow the front rail to be swung transversely to a position diagonally of the rear rail and the coop turned as it is pushed forwardly. The fact that the wheels and their brackets are in the form of castors assists in turning the coop as it follows the transversely shifted front rails.

Having thus described the invention, what is claimed is:

A track of the character described comprising a plurality of sections having upstanding flanges spaced from each other transversely of the track a distance adapting the track to receive traction members between the flanges, each section having upper faces of its flanges formed with sockets open at their upper ends located adjacent one end of the track section, and hooks pivoted to outer side faces of the flanges in spaced relation to the other end of the track section for vertical swinging movement, the hooks being formed from metal strands of a length adapting them to extend from the last mentioned end of the track section into overlapping engagement with outer side faces of the flanges of an adjoining track section and having free end portions bent to form upstanding bills having portions extending inwardly across upper edge faces of the flanges and terminating in depending pins for engaging in sockets of said adjacent track section and releasably holding the track sections in end to end engagement with each other.

RUTH G. CLARK.

REFERENCES CITED

The following references are of record in the file of this patent:

UNITED STATES PATENTS

| Number | Name | Date |
|---|---|---|
| 245,876 | Schroeder | Aug. 16, 1881 |
| 1,065,989 | Verbeke | July 1, 1913 |